United States Patent [19]
Lucid

[11] 3,821,351
[45] June 28, 1974

[54] SOLVENT EXTRACTION OF METAL IONS USING N-SUBSTITUTED HYDROXAMIC ACIDS

[75] Inventor: Michael Francis Lucid, Oklahoma City, Okla.

[73] Assignee: Kerr-McGee Corporation, Oklahoma City, Okla.

[22] Filed: Sept. 18, 1972

[21] Appl. No.: 289,875

Related U.S. Application Data

[63] Continuation-in-part of Ser. No. 149,762, June 3, 1971, abandoned.

[52] U.S. Cl............................ 423/9, 423/24, 423/54, 423/63, 423/139
[51] Int. Cl............................................ C02b 1/48
[58] Field of Search.............. 423/9, 24, 54, 63, 139

[56] References Cited
UNITED STATES PATENTS
2,863,892   12/1958   James et al. ........................ 23/340 X FOREIGN PATENTS OR APPLICATIONS
277,984      1967   Australia................................ 423/9

OTHER PUBLICATIONS

Stary, J., "The solvent Extraction of Metal Chelates" 1964, pp. 122–127. QD 411 882

Korkisch, J. "Modern Methods for the Separation of Rarer Metal Ions," 1969. QD63 54K6

*Primary Examiner*—Carl D. Quarforth
*Assistant Examiner*—R. L. Tate
*Attorney, Agent, or Firm*—William G. Addison

[57] ABSTRACT

This invention relates to the recovery of metal ions from an aqueous medium and in particular to a solvent extraction process employing certain N-substituted hydroxamic acids as extractants.

16 Claims, No Drawings

SOLVENT EXTRACTION OF METAL IONS USING N-SUBSTITUTED HYDROXAMIC ACIDS

CROSS REFERENCE TO RELATED APPLICATIONS

This application is a continuation-in-part of copending application serial no. 149,762 filed June 3, 1971, now abandoned.

BACKGROUND OF THE INVENTION

Aqueous solutions of valuable metals are commonly produced by leaching of ores or concentrates with water, an acid or a base. The metals may be the major economic value in the ore or concentrate or they may be present as a contaminant in the final product or waste streams produced. For example, in the wet process method of producing phosphoric acid, phosphate rock is contacted with a mineral acid such as sulfuric acid. Most phosphate rock contains metal compounds in varying amounts. In many cases these metal compounds are dissolved from the phosphate rock and appear in the wet process acid as contaminants. Vanadium compounds are among those dissolved from the phosphate rock, particularly when the rock is from the so-called western phosphate deposits of Idaho, Wyoming, Utah and Montana.

Vanadium is an undesirable component of wet process phosphoric acid made from western phosphate deposits in that it prevents the use of the phosphoric acid in making animal feed supplements, as the amount of vanadium must be kept at a low level in such animal feed supplements.

Vanadium and other metals such as iron and molybdenum are also present in uranium-bearing ores such as those found at Grants, New Mexico. There the uranium is recovered by solvent extraction and the metals are carried away in a raffinate as waste. Uranium ores from other areas may contain copper.

These same metals are also present in titanium ores. In a common titanium tetrachloride purification process the metals, in the form of metal chlorides, are contacted with an organic solvent. The titanium tetrachloride dissolves in the organic solvent and the metal chlorides other than titanium form a sludge which can be removed mechanically. The sludge is quenched with water whereupon it dissolves forming an aqueous acidic waste solution containing the metals.

These metals are valuable materials and processes such as those discussed above can provide an important source of such metals. Therefore, a process for the recovery of those metals from such processes provides an important benefit, in that the metals are converted from an undesirable contaminant or waste to a valuable by-product.

Further, there are a number of methods for producing aqueous solutions of metals as a primary means of recovering the metals. For example, copper may be leached from ores with aqueous ammonia to produce an ammoniacal copper solution. Uranium solutions of near neutral pH are produced by leaching low grade uranium ore deposits with dilute sulfuric acid. Vanadium solutions may be produced by either acid or water leaching of vanadium concentrates. Therefore, a process for recovering these metals from such solutions is also desirable.

N-substituted hydroxamic acids have been used heretofore as extractants for certain metal ions. However, the N-substituted hydroxamic acids known heretofore have an excessively high solubility in the aqueous solution from which the metal ion is extracted. This necessarily results in a loss of the extractant to the aqueous solution. Obviously, of course, for an extractant to be suitable for use in a commercial solvent extraction process, it is essential that the extractant be substantially insoluble in the aqueous solution to prevent such loss.

Examples of such prior art extractants are disclosed in the literature, viz., Stary, J., *The Solvent Extraction of Metal Chelates*, (Pergamon Press Book, 1964) pp. 122–127, and Korkisch, *Modern Methods For the Separation Of Rarer Metal Ions*, (Pergamon Press Book, 1969) pp. 447–448. A typical prior art extract disclosed therein is N-Benzoyl-N-phenylhydroxylamine which forms water-insoluble chelates with many metals. However, it has a solubility in water of about 425 ppm. An extractant for use in a commercial solvent extraction process should have a solubility in water of less than about 200 ppm, thus, N-Benzoyl-N-phenylhydroxylamine is not a satisfactory commercial extractant. Clearly, therefore, there still is need for an improved extractant and process for recovering metal ions from aqueous solutions.

SUMMARY OF THE INVENTION

It now has been discovered that certain N-substituted hydroxamic acids are suitable extractants for the recovery of metal ions on a commercial basis. The term metal ion as used herein refers to copper in the divalent state (II), molybdenum in the hexavalent state (VI), uranium in the hexavalent state (VI), iron in the trivalent (III) state, and vanadium in the tetravalent (IV) and pentavalent (V) states.

Broadly, the process of the present invention comprises contacting a metal ion-containing aqueous medium with a water-immiscible organic phase comprising an inert solvent and the substantially water-insoluble N-substituted hydroxamic acid compound, as defined herein, whereby the metal ion is preferentially extracted into the organic phase. The loaded organic phase is separated from the aqueous medium by virtue of its immiscibility. The metal ion can then be recovered from the loaded organic phase by various procedures including contacting said loaded phase with an aqueous stripping medium. The extractants and process are particularly suitable for the recovery of vanadium from acidic process liquors, which may be either strong or dilute, molybdenum from aqueous acidic medium, uranium from an aqueous medium having a pH of from about 3.0 to 11.0 and copper from an aqueous ammonia medium.

DESCRIPTION OF THE PREFERRED EMBODIMENTS

The substantially water-insoluble N-substituted hydroxamic acid extractants used in the present invention have a solubility in an aqueous medium of less than about 200 ppm and the following general formula:

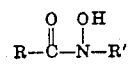

where R and R' may be any of a variety of organic radicals, such as alkyl, arylalkyl, aroxyalkyl, alkylaryl, alkoxyaryl and aryl radicals. Preferably, R and R' are organic radicals containing from about six to 20 carbon atoms. The N-substituted hydroxamic acids also preferably contain a total of from at least 12 to about 40 carbon atoms. In order for the extractant to possess the desired solubility requirements it is essential that when R' is phenyl, that R is selected from the group consisting of alkyl, arylalkyl, alkylaryl, alkoxyaryl and aroxy alkyl radicals. Alkyl as used generally and defined herein refers to saturated aliphatic hydrocarbon radicals. Representative compounds are N-phenyl-2-ethylhexanohydroxamic acid, N-4-n-heptylbenzohydroxamic acid and N-phenyl-4-t-butylbenzohydroxamic acid. The latter compound has the following structural formula:

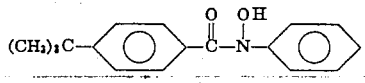

Representative of other organic radicals are: heptyl, octyl, decyl, octadecyl, diethylheptyl, butylcyclohexyl, p-ethylphenyl, p-t-butylphenyl, p-octylphenyl, p-pentyloxyphenyl, p-octyloxyphenyl, phenylmethyl, phenoxymethyl and the like.

The N-substituted hydroxamic acid extractants contemplated herein are characterized as having a solubility of at least 0.5 percent by weight in the inert solvent used to make up the organic phase and substantially complete insolubility in water. They are further characterized as having a solubility, in the aqueous medium from which a metal ion is to be extracted, of less than about 200 parts per million by weight. In addition, it is believed that the metal ion and the N-substituted hydroxamic acid extractant form a complex during the initial extraction step and such complex, when formed, should also have a solubility of at least 0.5 percent by weight in the organic phase. For example, in the extraction of oxovanadium (IV), a complex of the following type probably is formed.

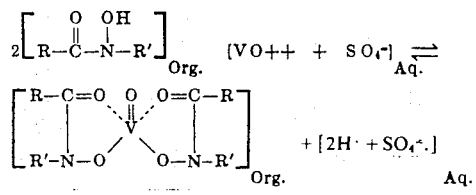

The N-substituted hydroxamic acids are prepared by reacting a carboxylic acid chloride with a N-substituted hydroxylamine. Such reactions can be carried out by contacting the reactant in an ether, such as diethyl ether or tetrahydrofuran, and removing the acid produced by the reaction by employing an excess of the N-substituted hydroxylamine reactant or by adding some other acid acceptor, such as pyridine, triethylamine or sodium carbonate. This general synthesis procedure is illustrated by the following examples.

EXAMPLE A

To a stirred solution of 15.5 g. (0.15 mole) of N-phenylhydroxylamine in 200 ml. of diethyl ether at −25°C. was added dropwise from two separate addition funnels 14.2 ml. (0.15 mole) of pyridine and 20.7 g. (0.13 mole) of n-octanoyl chloride. After completion of the addition, the reaction mixture was evaporated to dryness. The residue was dissolved in 500 ml. of benzene and washed with dilute hydrochloric acid. After drying the organic phase over anhydrous sodium sulfate, it was evaporated to dryness. Two recrystallizations of the residue from Skellysolve B yield 15.5 g. (a 46 percent yield) of N-phenyl-n-octanohydroxamic acid as a white crystalline powder, m.p. 60°–62°C.

Anal. Calcd. for $C_{14}H_{21}NO_2$: C, 71.45; H, 9.00; N, 5.95. Found: C, 71.45; H, 8.79; N, 6.23.

EXAMPLE B

To a solution of 21.8 g. (0.2 mole) of N-phenylhydroxylamine in 500 ml. of diethyl ether at 0°C. was added dropwise with stirring 16.3 g. (0.1 mole) of 2-ethylhexanoyl chloride. The reaction mixture was stirred and allowed to warm to room temperature over a 4 hour period. The precipitated material in the reaction mixture was removed by filtration. The filtrate was washed with water, dried over anhydrous sodium sulfate and evaporated to dryness to obtain 16.5 g. (a 70 percent yield) of N-phenyl-2-ethylhexanohydroxamic acid as a light yellow oil, pour point ca. −60°C.

Anal. Calcd. for $C_{14}H_{21}NO_2$: C, 71.45; H, 9.00; N, 5.95. Found: C, 71.58; H, 8.88; N, 6.12.

Other suitable substantially water-insoluble N-substituted hydroxamic acid extractants can be prepared by reacting the appropriate carboxylic acid chloride with the N-substituted hydroxylamine. It is also preferred to use an excess of the N-substituted hydroxylamine to serve as the acid acceptor.

In addition to the above described N-substituted hydroxamic acid compounds, the organic phase comprises an inert liquid solvent. Such solvent must, of course, be water-immiscible so as to be separable from the aqueous medium originally containing the metal ion. Suitable solvents include aliphatic and aromatic hydrocarbons and certain chlorinated compounds, such as hexane, heptane, kerosene, fuel oil, benzene, toluene, xylene, chloroform, ethylene dichloride and carbon tetrachloride. Further examples are iso-octane, "Soltrol 170" (a commercially available naphthenic hydrocarbon solvent), mineral oils and the like. Generally, the N-substituted hydroxamic acid extractant will be present in the organic phase in an amount sufficient to extract at least a portion of the metal ion from the aqueous medium. Preferably the hydroxamic acid will be present in an amount of from about 0.5 to about 50 percent by weight based on the total organic phase with an amount of from 1 to 10 percent by weight being particularly preferred.

The organic phase may also contain other materials such as a modifier which typically is a long chain aliphatic alcohol such as capryl alcohol, isodecanol, tridecyl alcohol or 2-ethylhexanol. If the modifier is present in the organic phase, it will normally be used in amounts ranging from 0.5 to 30 weight percent based on the weight of the total organic phase. In some cases these modifiers modify the chemical properties of the organic extractant solution as well as the physical properties. This is particularly true in the case of vanadium extraction. The addition of an aliphatic alcohol reduces the amount of oxidative attack on the hydroxamic acid during vanadium (V) extraction and prevents degradation of the extractant during extraction of vanadium (IV).

In some cases the metal ion can be stripped from the loaded organic phase by contacting with a concentrated solution of a strong mineral acid, such as hydrochloric acid or sulfuric. However, it is usually more desirable to strip vanadium (V) out of the loaded organic phase by employing an aqueous solution of a strong base. Suitable bases include sodium hydroxide and potassium hydroxide.

The liquid-liquid extraction process of the present invention can be carried out on a single-stage batch basis or in a continuous countercurrent mixer-settler unit. The number of stages can be varied as desired, depending on the efficiency of extraction and stripping steps.

The invention is further described by the following examples which are illustrative only and do not constitute limitations on the invention.

EXAMPLE I

The aqueous medium, and aqueous acidic feed solution, simulating a liquor of possible commercial importance was made up as follows: 2.19 g. of vanadyl sulfate ($VOSO_4 \cdot 2H_2O$) was dissolved in 1 liter of distilled water and concentrated sulfuric acid was added dropwise to adjust the pH to 1. Fifteen-milliliter portions of the feed solution which analyzed 1.07 g. $V_2O_5$/liter (equivalent to 0.012 M VO++) was contacted for 100 minutes, by shaking in separatory funnels with 15 ml. portions of organic solutions of various N-substituted hydroxamic acids. Separation of the phases followed by analysis gave the data as set forth in Table 1.

TABLE I

| Hydroxamic Acid Extractant | Organic Solvent | Organic Phase Molarity | Vanadium in Raffinate (as g. $V_2O_5$/l) | Percent Vanadium Extracted |
|---|---|---|---|---|
| N-Cyclohexyl-n-octano-hydroxamic Acid | Toluene | 0.05 | 0.34 | 68.0 |
| N-Cycloheptyl-benzo-hydroxamic Acid | Toluene | 0.05 | 0.19 | 82.0 |

The above data show that excellent extraction of oxovanadium (IV) from a highly acidic solution is obtained by using certain N-substituted hydroxamic acids according to the process of the present invention.

EXAMPLE II

An aqueous acid feed solution, simulating a liquor of possible commercial importance, was made up as follows: 1.34 g. of sodium metavanadate ($NaVO_3$) was dissolved in 1 liter of distilled water by warming and the pH was adjusted to 1 by the dropwise addition of concentrated sulfuric acid. Fifteen-milliliter portions of the feed solution which analyzed to 1.0 g. $V_2O_5$/liter (equivalent to 0.001 M $VO_2+$) were contacted for 5 minutes, by shaking in separatory funnels with 15 ml. portions of organic solutions of various N-substituted hydroxamic acids. The extraction results are set forth in Table II.

TABLE II

| Hydroxamic Acid Extractant | Organic Solvent | Organic Phase Molarity | Vanadium in Raffinate (as g. $V_2O_5$/l) | Percent Vanadium Extracted |
|---|---|---|---|---|
| N-Phenyl-n-octano-hydroxamic Acid | n-Hexane | 0.213 | 0.000 | 100.0 |
| N-Cyclohexyl-n-octanohydroxamic Acid | Toluene | 0.207 | 0.000 | 100.00 |
| N-4-n-Heptyl-2-ethylhexanohydroxamic Acid | n-Hexane | 0.078 | 0.000 | 100.00 |
| N-Phenyl-2-ethylhexanohydroxamic Acid | n-Hexane | 0.213 | 0.164 | 83.6 |

The above data show that excellent extraction of dioxovanadium (V) from a highly acidic solution is achieved by employing certain N-substituted hydroxamic acid extractants which are specified in the present invention.

EXAMPLE III

A commercial phosphoric acid process liquor (about 40 weight percent phosphoric acid) which contained many different metal ions (iron, mercury, manganese, magnesium, aluminum, chromium, calcium, copper and uranium) and about 1.6 g. of vanadium (as $V_2O_5$) per liter was used as the initial feed stock. This solution was heated to about 50°C. and 1.2 g. of sodium chlorate was added per liter of solution. The mixture was agitated at 50°C. for a period of about 1 hour and allowed to cool to room temperature before using. Fifteen-milliliter portions of the oxidized feed stock which analyzed 1.60 g. $V_2O_5$/liter (equivalent to 0.018 M $VO_2$ ) were contacted for 5 minutes, by shaking in separatory funnels with 15-ml. portions of organic solutions of various N-substituted hydroxamic acids. The extraction results are summarized in Table III.

The extraction data shown in Table III show that the present invention is very valuable for the extraction of vanadium from acidic process liquors.

EXAMPLE IV

Acidic uranium plant effluents frequently contain tetravalent vanadium and trivalent iron. Recovery of

TABLE III

| Hydroxamic Acid Extractant | Organic Solvent | Organic Phase Molarity | Vanadium in Raffinate (as g. $V_2O_5$/l) | Percent Vanadium Extracted |
|---|---|---|---|---|
| N-4-Heptyl-2-ethyl-hexanohydroxamic Acid | n-Hexane | 0.078 | 0.000 | 100.0 |
| N-Cyclohexyl-2-ethylhexano-hydroxamic Acid | n-Hexane | 0.207 | 0.055 | 96.6 |
| N-Phenyl-n-octano-hydroxamic Acid | n-Hexane | 0.213 | 0.190 | 88.1 |
| N-4-n-Heptylbenzo-hydroxamic Acid | Benzene, 1:1 | 0.040 | 0.000 | 100.0 | the vanadium for sale and recovery of the iron (III) for recycle as an oxidant in the leach step would be desirable. The N-substituted hydroxamic acids of this invention will extract these elements. The following data give the percent $V_2O_5$ extraction in an aqueous to organic ratio of 1, single stage extraction with 0.05M hydroxamic acid in toluene from an actual plant liquor containing 0.26 g/l $V_2O_5$ and 2.47 g/l Fe. Also given is the percent of theoretical loading of iron assuming a 3:1 extractant to iron mole ratio.

TABLE IV

| N-substituted hydroxamic acid | Percent $V_2O_5$ extracted | Percent Fe loading |
|---|---|---|
| $(H_3C)_3C$—⌬—C(=O)—N(OH)—⌬ | 88.5 | 92.4 |
| $n$-$C_3H_{13}$—⌬—C(=O)—N(OH)—⌬ | 88.5 | 46.2 |
| $n$-$C_4H_9$—CH($C_2H_5$)—C(=O)—N(OH)—⌬ | 88.5 | 62.3 |
| $n$-$C_5H_{11}O$—⌬—C(=O)—N(OH)—⌬ | 92.3 | 63.3 |
| $n$-$C_7H_{15}$C(=O)—N(OH)—⌬ | 84.5 | 72.0 |
| $n$-$C_4H_9$CH($C_2H_5$)—C(=O)—N(OH)—CH($n$-$C_3H_7$)$_2$ | 73.1 | 6.4 |

It is not intended that this example limit the use of the extractants for recovering vanadium (IV), and iron (III) to this application. The application of this invention to iron, vanadium and molybdenum recovery from uranium plant liquors is greatly expanded in Example V.

EXAMPLE V

Acidic uranium plant streams frequently contain molybdenum (VI) in addition to vanadium (IV), iron (III) and uranium (VI). In a typical plant the uranium ore is leached with sulfuric acid, the uranium is then extracted from the leach liquor with an amine extractant leaving an aqueous phase. Portions of the aqueous phase from that extraction are used to wash the leached ore along with limited quantities of water. These combined washings are usually sent to waste ponds to be evaporated. Thus, there are three solutions available from the described process from which metals may be extracted. These are as follows:

Solution A: The uranium pregnant acid leach liquor.

Solution B: The uranium barren aqueous phase from amine extraction.

Solution C: The washing liquors which go to the waste ponds.

Samples of each of the three solutions described above were obtianed from an operating uranium plant. Each of these solutions was contacted for 15 minutes, in a separatory funnel, with equal volumes of an organic solution containing 0.05 N-cyclohexyl-2-ethylhexanohydroxamic acid - 5 percent tridecanol in a kerosene-like hydrocarbon diluent (Soltrol 170) at ambient temperatures. The data obtained (Table V) clearly show that molybdenum extracts easily from all of the solutions, vanadium (IV) extracts readily from solution C and less well from solutions A and B. Some iron (III) extracts from all three solutions. No significant uranium extraction occurs from any of the three solutions. Thus, it has been found that molybdenum can be selectively extracted from a uranium containing solution at any pH within the range of from about 0.3 to 2.5.

EXAMPLE VI

The following example demonstrates the extraction of $U_3O_8$ from an aqueous medium with a typical N-

TABLE V

| SOLUTION | AQUEOUS ANALYSIS | | | | | |
|---|---|---|---|---|---|---|
| | A | | B | | C | |
| | Feed | Raffinate | Feed | Raffinate | Feed | raffinate |
| pH | 1.12 | 1.10 | 1.12 | 1.05 | 1.92 | 1.65 |
| Fe(II) (g/l) | 1.13 | 1.11 | 1.23 | 1.20 | .02 | .10 |
| Fe(III) (g/l) | 1.57 | 1.21 | 1.45 | 1.09 | 2.73 | 2.06 |
| $V_2O_5$ (g/l) | .364 | .312 | .355 | .325 | .273 | .008 |
| $U_3O_8$ (g/l) | .821 | .826 | .0037 | .0039 | .0124 | .012 |
| Mo (g/l) | .016 | .003 | .008 | .003 | .009 | .003 |

TABLE VII

| Test No. | Aqueous Feed g Cu/l | pH | Aqueous Raffinate g Cu/l | pH | Loaded Organic g Cu/l | Percent Copper Extracted |
|---|---|---|---|---|---|---|
| 1 | 0.84 | 1.0 | 0.83 | 1.05 | 0.01 | 1.19 |
| 2 | .84 | 2.0 | .82 | 1.87 | .02 | 2.38 |
| 3 | .84 | 3.0 | .74 | 2.10 | .10 | 11.90 |
| 4 | .84 | 9.3* | .02 | 9.3 | .82 | 97.6 |

* 1 g $(NH_4)_2SO_4/l$ added as buffer to solubilize copper.

substituted hydroxamic acid wherein the aqueous medium is an aqueous solution containing the $U_3O_8$. Portions of an organic solution containing 0.025 molar N-phenyl-2-ethylhexanohydroxamic acid in toluene were contacted with equal volumes of solutions containing 0.3 g/l $U_3O_8$. The pH of each mixture was adjusted with sodium hydroxide or sulfuric acid. The following data show percent extraction as a function of the equilibrium pH.

TABLE VI

| pH | Percent $U_3O_8$ Extracted |
|---|---|
| 0.94 | 0 |
| 1.90 | 2.92 |
| 3.89 | 15.3 |
| 4.92 | 90.3 |
| 7.55 | 90.9 |

As shown by the data, the percent $U_3O_8$ extracted increases with increasing pH. The optimum extraction is obtained when the pH is maintained within the range of from about 4.0 to 9.0. However, significant amounts of $U_3O_8$ may be extracted at a pH of from about 3.5 to 11.0.

EXAMPLE VII

Quantitative extraction of copper from an aqueous medium having a pH greater than 3.0 is possible using the N-substituted hydroxamic acids of the present invention whereas below a pH of about 2.5 substantially no copper is extracted. The pH should be maintained within the range of 3 to 14. The best results have been obtained thus far when the pH was maintained within a preferred range of from about 6.5 to 11.0. The following tests demonstrate the extraction of copper from an aqueous medium at various pH values with a typical hydroxamic acid.

An aqueous feed solution was prepared containing 0.84 gm/l of copper (added as $CuSO_4 \cdot 5H_2O$) and the pH adjusted to the desired level with sulfuric acid or ammonium hydroxide. The organic extractant was prepared by dissolving the required amount of N-Cyclohexylbenzohydroxamic acid in toluene to make the solution 0.045M. The organic solution also contained five volume percent tridecanol.

Equal volumes of the aqueous copper feed solution and organic solvent were measured into a separatory funnel and equilibrated by mixing for 10 minutes on a wrist action shaker. After the phases separated due to their immiscibility, the aqueous phases were analyzed for copper and the pH of each phase measured. The results are shown in Table VII.

EXAMPLE VIII

Molybdenum may be extracted at any pH of less than 7.0. However, it is preferred to maintain the pH at from about 0.5 to 6.0.

The extraction of molybdenum by N-substituted hydroxamic acids is shown by the following experiment. An aqueous feed medium was prepared comprising an aqueous solution containing 0.2 gm/l molybdenum (added as sodium molybdate) and the pH adjusted to the desired level with sulfuric acid. The organic extractant was 0.05M N-phenyl-1-naphthohydroxamic acid dissolved in toluene.

Equal volumes of the aqueous molybdenum solution and the organic extractant were measured into a separatory funnel and equilibrated by mixing for 10 minutes on a wrist action shaker. The aqueous and organic phases were separated and the aqueous solutions analyzed for molybdenum. The results are shown in Table VIII below.

TABLE VIII

| Test No. | Aqueous Feed g Mo/l | pH | Aqueous Raffinate g Mo/l | pH | Loaded Organic g Mo/l | Percent Molybdenum Extracted |
|---|---|---|---|---|---|---|
| 1 | 0.20 | 1.0 | 0.004 | 1.0 | 0.196 | 98.3 |
| 2 | .20 | 2.5 | .001 | 2.5 | .189 | 94.4 |
| 3 | .20 | 5.0 | .056 | 6.2 | .144 | 72.2 |
| 4 | .20 | 7.0 | .189 | 7.5 | .011 | 5.5 |
| 5 | .20 | 9.0 | .20 | 8.6 | 0 | 0 |

For a similar series of tests with a 0.20 gm/l tungsten solution, no extraction was obtained at any pH. This shows that the N-substituted hydroxamic acids may be used to selectively extract molybdenum from a mylybdenum-tungsten solution.

EXAMPLE IX

The extraction of vanadium (V) from an aqueous medium comprising an acidic chloride solution is shown by the following example. An aqueous chloride feed solution was obtained from a $TiCl_4$ purification process and contained titanium, niobium, zirconium, iron and aluminum in addition to vanadium.

Equal volume portions of the aqueous feed solution were extracted with 0.20M N-Cyclohexyl-2-ethylhexano-hydroxamic acid-10 percent TDA-toluene organic for ten minutes.

The vanadium in the solution was initially present in the tetravalent oxidation state. Oxidation to the pentavalent state was carried out with sodium chlorate. The initial feed contained 7.06 gm/l of $V_2O_5$, whereas after extraction it contained 1.19 gm/l of $V_2O_5$. Thus, showing that 83.2 percent of the vanadium (V) had been extracted.

It is to be understood that the invention is not to be limited to the exact details of operation or the exact processes shown and described, as obvious modifications and equivalents will be apparent to those skilled in the art.

What is claimed is:

1. A process for extracting at least one metal ion from an aqueous medium containing said metal ion comprising contacting said medium with a water-immiscible organic solvent containing an N-substituted hydroxamic acid extractant to form an organic phase containing said metal ion separate from an aqueous phase and recovering said metal ion from the organic phase; said metal ion being selected from the group consisting of iron in the trivalent oxidation state, molybdenum in the hexavalent state, copper in the divalent state, uranium in the hexavalent state, vanadium in the tetravalent oxidation state and vanadium in the pentavalent oxidation state, said N-substituted hydroxamic acid containing from at least 12 to about 40 carbon atoms, having a solubility in water of less than 200 ppm and being represented by the general formula

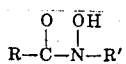

wherein R and R' are organic radicals selected from the group consisting of alkyl, alkylaryl, aroxyalkyl, arylaklyl, alkoxyaryl and aryl radicals, further providing that when R' is phenyl, R is selected from the group consisting of alkyl, arylalkyl, alkylaryl, alkoxyaryl and aroxyalkyl radicals to provide a substantially water-insoluble extractant.

2. The process of claim 1 wherein said organic solvent contains from about 0.5 to 30 percent by weight of an aliphatic alcohol.

3. The process of claim 1 wherein said N-substituted hydroxamic acid is selected from the group consisting of N-cyclohexyl-2-ethylhexanohydroxamic acid, N-cyclohexyl-n-octanohydroxamic acid, N-phenyl-n-octanohydroxamic acid, N-phenyl-2-ethylhexanohydroxamic acid and N-phenyl-4-t-butylbenzohydroxamic acid.

4. The process of claim 1 wherein said metal ion is vanadium in the pentavalent oxidation state and said medium is an aqueous acidic solution.

5. The process of claim 4 wherein said acidic solution is a phosphoric acid solution.

6. The process of claim 1 wherein said metal ion is uranium and said medium is an aqueous solution having a pH greater than 3.5.

7. The process of claim 1 wherein said metal ion is copper and said medium is an aqueous solution having a pH within the range of from about 3 to 14.

8. The process of claim 7 wherein the solution is ammoniacal, has a pH of at least 6.5, contains molybdenum in the hexavalent state and said organic phase formed containing the copper is substantially free of the molybdenum.

9. The process of claim 1 wherein said metal ion is molybdenum and said medium is an aqueous acidic solution.

10. The process of claim 9 wherein said solution contains tungsten and said organic phase formed is substantially free of the tungsten.

11. The process of claim 9 wherein the solution contains uranium in the hexavalent state, has a pH of from about 0.3 to 2.5 and said organic phase formed is substantially free of the uranium.

12. The process of claim 9 wherein the solution has a pH of less than about 2.5, contains copper in the divalent state and said organic phase formed is substantially free of the copper.

13. The process of claim 1 wherein said metal ion is vanadium in the pentavalent oxidation state and said medium is an aqueous acidic chloride solution.

14. The process of claim 1 wherein said metal ion is vanadium in the tetravalent oxidation state and said medium is an aqueous acidic solution.

15. The process of claim 14 wherein the solution has a pH of less than about 2.5, contains uranium in the hexavalent oxidation state and the organic phase formed is substantially free of the uranium.

16. The process of claim 1 wherein said metal ion is iron in the trivalent oxidation state and said medium is an aqueous acidic solution.

* * * * *